US012783526B2

(12) United States Patent
Setlur et al.

(10) Patent No.: US 12,783,526 B2

(45) Date of Patent: Nov. 3, 2026

(54) REUSING CUSTOM CONCEPTS IN VISUAL ANALYTICS WORKFLOWS

(71) Applicant: Salesforce, Inc., San Francisco, CA (US)

(72) Inventors: Vidya Raghavan Setlur, Portola Valley, CA (US); Andrew Beers, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 11 days.

(21) Appl. No.: 18/429,373

(22) Filed: Jan. 31, 2024

(65) Prior Publication Data

US 2024/0289338 A1 Aug. 29, 2024

Related U.S. Application Data

(60) Provisional application No. 63/449,043, filed on Feb. 28, 2023.

(51) Int. Cl.

*G06F 16/2455* (2019.01)
*G06F 16/242* (2019.01)
*G06F 16/2457* (2019.01)

(52) U.S. Cl.

CPC .. *G06F 16/24568* (2019.01); *G06F 16/24573* (2019.01)

(58) Field of Classification Search

CPC ......... G06F 16/24568; G06F 16/24573; G06F 16/243; G06F 16/248; G06F 16/287; G06F 16/90332; G06F 16/24522

See application file for complete search history.

(56) References Cited

U.S. PATENT DOCUMENTS 10,884,694 B1 * 1/2021 Moy .................... G06F 3/04845
11,244,006 B1 * 2/2022 Setlur ................. G06F 16/2465
11,720,595 B2 * 8/2023 Zheng .................. G06F 16/244 707/705

(Continued)

OTHER PUBLICATIONS

Joseph, Manu, et al. "Askyourdb: An end-to-end system for querying and visualizing relational databases using natural language." arXiv preprint arXiv:2210.08532 (2022) (Year: 2022).*

(Continued)

*Primary Examiner* — Dennis Truong

(74) *Attorney, Agent, or Firm* — Morgan, Lewis & Bockius LLP

(57) ABSTRACT

A method is provided for reusing custom concepts in visual analytics workflows. The method includes displaying a data visualization for a data source. The method also includes receiving a natural language input directed to the visualization. The method also includes parsing the natural language input to data fields and/or data values. The method also includes executing queries to data sources for retrieving results, based on the data fields and/or the data values. The method also includes generating and storing a named concept from the results, including either (i) saving underlying data as the named concept or (ii) querying the results and saving resulting data as the named concept. Saving the underlying data corresponds to saving data in an attribute. Querying the results is performed when a referenced attribute is not part of the results so a new query is issued that adds data from the referenced attributes.

20 Claims, 8 Drawing Sheets

(56) References Cited

U.S. PATENT DOCUMENTS

| | | | | |
|---|---|---|---|---|
| 12,072,890 | B2 * | 8/2024 | Patni | G06F 16/128 |
| 12,217,000 | B1 * | 2/2025 | Setlur | G06F 16/34 |
| 12,287,954 | B1 * | 4/2025 | Atallah | G06F 16/248 |
| 2016/0357851 | A1 * | 12/2016 | Perkins | G06F 16/31 |
| 2017/0293472 | A1 * | 10/2017 | Catania | G06F 8/70 |
| 2021/0141838 | A1 * | 5/2021 | Atallah | G06F 16/9027 |
| 2021/0149886 | A1 * | 5/2021 | Zheng | G06N 5/02 |
| 2021/0149901 | A1 * | 5/2021 | Fonseca de Lima | G06F 16/24522 |
| 2021/0182020 | A1 * | 6/2021 | Kanuganti | G06F 3/167 |
| 2021/0319186 | A1 * | 10/2021 | Djalali | G06F 40/284 |
| 2022/0164395 | A1 * | 5/2022 | Setlur | G06F 16/24522 |
| 2022/0358129 | A1 * | 11/2022 | Patni | G06F 16/24539 |
| 2023/0185798 | A1 * | 6/2023 | Patel | G06F 16/2425 704/9 |
| 2023/0259705 | A1 * | 8/2023 | Tunstall-Pedoe | G06N 3/0499 704/9 |
| 2023/0336438 | A1 * | 10/2023 | Wernick | G06F 3/0484 |
| 2023/0394045 | A1 * | 12/2023 | Nixon | G06F 16/252 |

OTHER PUBLICATIONS

A. Narechania, A. Srinivasan and J. Stasko, “NL4DV: A Toolkit for Generating Analytic Specifications for Data Visualization from Natural Language Queries,” in IEEE Transactions on Visualization and Computer Graphics, vol. 27, No. 2, pp. 369-379, Feb. 2021 (Year: 2021).*

Salesforce, Inc., International Search Report and Written Opinion, PCT/US2024/017755, Jul. 11, 2024, 9 pgs.

* cited by examiner

400

REUSING CUSTOM CONCEPTS IN VISUAL ANALYTICS WORKFLOWS

RELATED APPLICATIONS

The present application claims priority to U.S. Provisional Application Ser. No. 63/449,043, filed Feb. 28, 2023, titled "Reusing Custom Concepts in Visual Analytics Workflows," which is incorporated by reference herein in its entirety.

TECHNICAL FIELD

The disclosed implementations relate generally to data visualization and more specifically to systems, methods, and user interfaces that enable users to interact with and explore datasets using a conversational interface.

BACKGROUND

Curated data with semantically meaningful attributes and concepts are an important aspect of visual analysis workflow. With the prevalence of natural language interfaces (NLIs) for data exploration, curated concepts can help support expressiveness when users craft natural language (NL) utterances. However, the process of information seeking is often dynamic and complex, where pre-defined curated static concepts are rather limiting as users express their utterances during the flow of their analysis. These utterances often contain complex analytical concepts involving multiple attributes that also specify conditions like filter expressions as users explore different aspects and subdomains of the underlying data. Further, users tend to reuse complex utterances in subsequent interactions and/or with other datasets.

SUMMARY

Accordingly, there is a need for in-situ semantic curation of analytical concepts that can be reused across different analytical workflows. To help realize custom analytical concepts during data exploration, in some implementations, NL utterances are represented as concrete descriptions that match the structure or content of the underlying data. Specifically, subexpressions within these utterances are converted into a set of analytical sub-expressions that resolve into structured queries containing attributes and values from the underlying data source. Some implementations provide concept-based or conceptual query interfaces that enable users to directly name and save constructs when querying databases.

In some implementations, analytical concepts are dynamically created and subsequently reused in analytical workflows. Some implementations allow users to save query results (particularly complex filter queries) as reusable concepts both within a conversational interface but also across multiple data sources. Specifically, some implementations provide an NL interface for interacting with data on a conversational platform (e.g., Slack). In some implementations, a parser determines intents and extracts entities from the utterances based on a set of machine learning trained analytical conversation patterns, returning text and chart responses to the user. During the interaction with the interface, users can save their conditional utterances as reusable concepts in the datasource that they are exploring and use these concepts in other queries and visual analytics tools, such as Tableau. The techniques described herein can be used to support in-situ semantic enrichment through the creation of reusable analytical concepts.

In accordance with some implementations, a method executes at an electronic device with a display, one or more processors, and memory. For example, the electronic device can be a smart phone, a tablet, a notebook computer, or a desktop computer. The method can be used for reusing custom concepts in visual analytics workflows. The method includes displaying a data visualization generated from data in a data source. The method also includes receiving a natural language input directed to the data visualization. The method also includes parsing the natural language input to identify one or more data fields and/or one or more data values in the displayed data visualization. The method also includes executing one or more queries to one or more data sources for retrieving one or more results, based on the one or more data fields and/or the one or more data values. The method also includes generating and storing a named concept from the one or more results, including either (i) saving underlying data as the named concept or (ii) querying the one or more results and saving resulting data as the named concept. Saving the underlying data corresponds to saving data in an attribute as the named concept. Querying the one or more results is performed when a referenced attribute is not part of the one or more results so a new query is issued that adds data from the referenced attribute.

In some implementations, the method further includes triggering one or more actions based on the one or more data fields (also referred to as "attributes") and/or the one or more data values, where the one or more actions represent analytical operations that satisfy a user's intent specified in the natural language input. The one or more actions subsequently trigger the one or more queries.

In some implementations, each action of the one or more actions is realized with a corresponding function that parameterizes entities recognized from the natural language input and the current conversational state.

In some implementations, the current conversational state encompasses a current data source, a most recent query posed, a result for that query, any filters in play, and any previously saved named concepts.

In some implementations, the method further includes subsequently using the named concept in one or more analytical queries that follow the natural language input.

In some implementations, the method further includes subsequently using the named concept in one or more analytical queries directed to other data sources with shared attributes.

In some implementations, the method further includes subsequently using the named concept in one or more analytical queries posed by one or more users that are different from a user who created the named concept.

In some implementations, the method further includes persisting the named concept in the data source from which the named concept is created.

In some implementations, the parsing includes extracting intents and data entities from the natural language input using a natural language parser.

In some implementations, the natural language parser is trained on a set of analytical intents using a conversational artificial intelligence library.

In some implementations, executing the one or more queries includes running, against a set of configured data sources, one or more analytical queries based on the intents and data entities, thereby returning the one or more results.

In some implementations, the natural language parser is trained on a set of analytical inquiries using templates of crowdsourced analytical queries. The templates include slots for attributes that the natural language parser needs to recognize from a natural language utterance. The training specifies a set of data sources for the natural language parser to operate on. Sample utterances and entities are dynamically generated as input to the training using the templates as a guide.

In some implementations, the method further includes, in response to a user requesting, via a natural language utterance, to make the named concept available in a specified data source, subsequently using the named concept in one or more analytical queries directed to the specified data source.

In some implementations, the method further includes subsequently using the named concept in other visual analysis tools that import the data source for analysis.

In some implementations, the method further includes subsequently using the named concept as a custom field to filter values in a line chart.

In some implementations, the method further includes associating a user with the named concept, and managing updates and/or refinements to the named concept based on the association.

In some implementations, the method further includes associating a user with the named concept, and performing at least one of: personalizing the named concept for a user, controlling access to the named concept, and personalizing the saved concept based on a dataset.

In some implementations, the natural language input is received via a natural language conversational interface that supports analytical queries that include aggregation, grouping, and filtering.

In some implementations, the natural language conversational interface produces a text response for a single result and visualizations for results that return more than a single row.

In some implementations, the method further includes building a concept map based on common attributes and determining relational dependencies to place the named concept at an appropriate level in a concept hierarchy or a concept nesting, and based on concepts in the concept map, providing recommendations that are relevant scaffolding and/or guidance to support natural language interface users as they frame their natural language utterance while exploring data.

In some implementations, the method further includes tracking frequency and commonality of a combination of attributes in input natural language utterances to automatically trigger the generation and storing of the named concept without user input.

In some implementations, the method further includes parameterizing the named concept based on attribute values and data types, and reusing the named concept based on the parameterization.

Typically, an electronic device includes one or more processors, memory, a display, and one or more programs stored in the memory. The programs are configured for execution by the one or more processors and are configured to perform any of the methods described herein.

In some implementations, a non-transitory computer readable storage medium stores one or more programs configured for execution by a computing device having one or more processors, memory, and a display. The one or more programs are configured to perform any of the methods described herein.

Thus methods, systems, and graphical user interfaces are disclosed that allow users to reuse custom concepts during visual analytic workflows.

The terms "attribute" and "data field" are used interchangeably herein.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide reuse of custom saved concepts should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some implementations provide an analytical chatbot (e.g., a software application that engages in a natural language (NL) dialogue with the user about data) with a user interface exposed via a conversational user interface, such as Slack.

Figure 1:
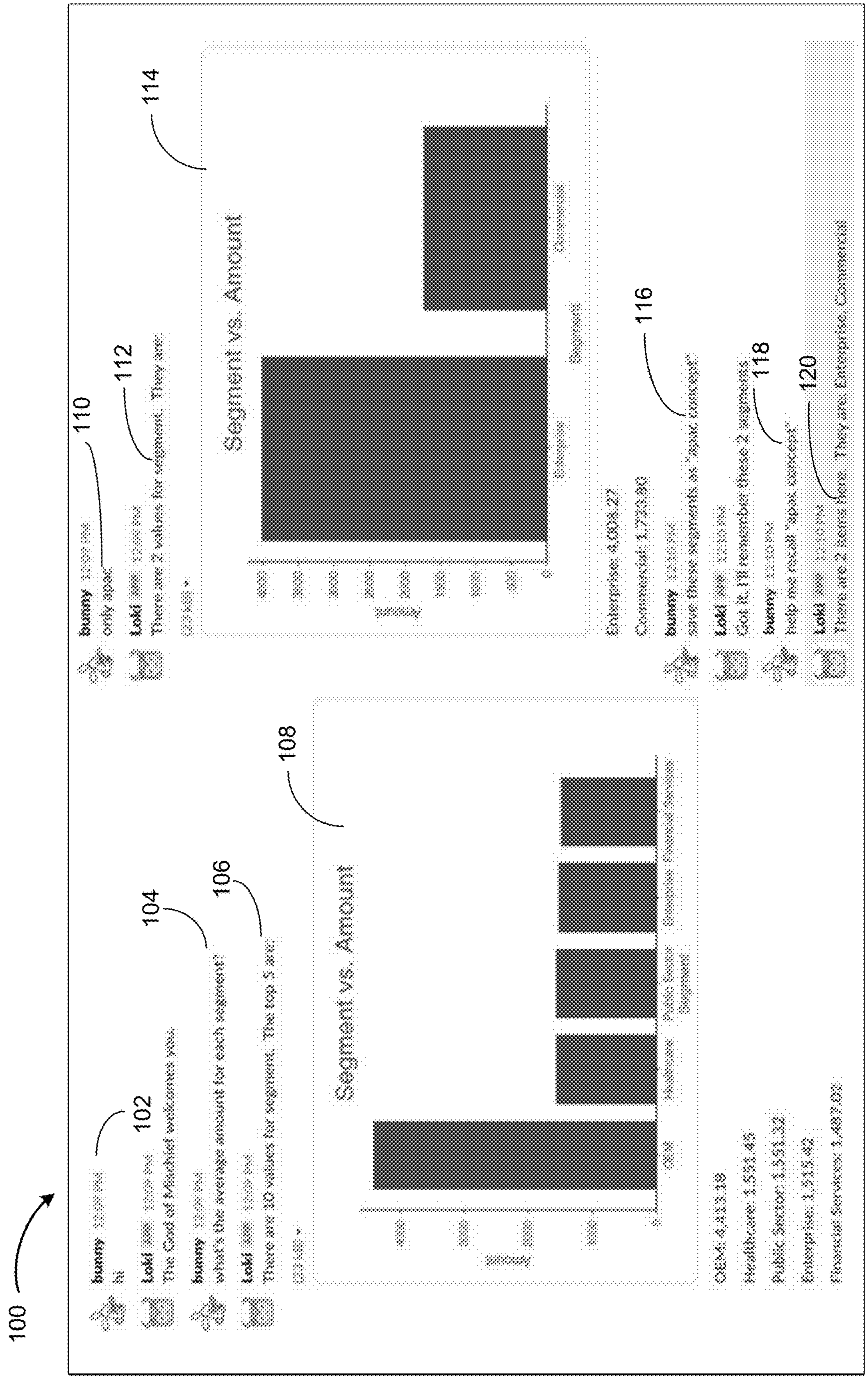
FIG. 1 shows an example user session, according to some implementations.

FIG. 1 shows an example user session 100, according to some implementations. The user session corresponds to a conversational interaction between a user named 'bunny' and the system described herein in a conversational interface using a sales transactions data source. A user greets (102) the chatbot and asks, "what is the average amount for each segment?" (104). The system responds with a chart 108 and a text response 106. The user continues to interact by filtering (110) to the 'apac' region. The system responds with a new text summary 112 followed by another chart 114. The user saves (116) the remaining segments as a reusable concept, called "apac concept." The system responds by saving the apac concept. The user may then ask the system to help recall (118) the "apac concept" to which the system responds (120) with details of the concept.

Example System for Reusing Concepts in Visual Analytics Workflows

Figure 2:
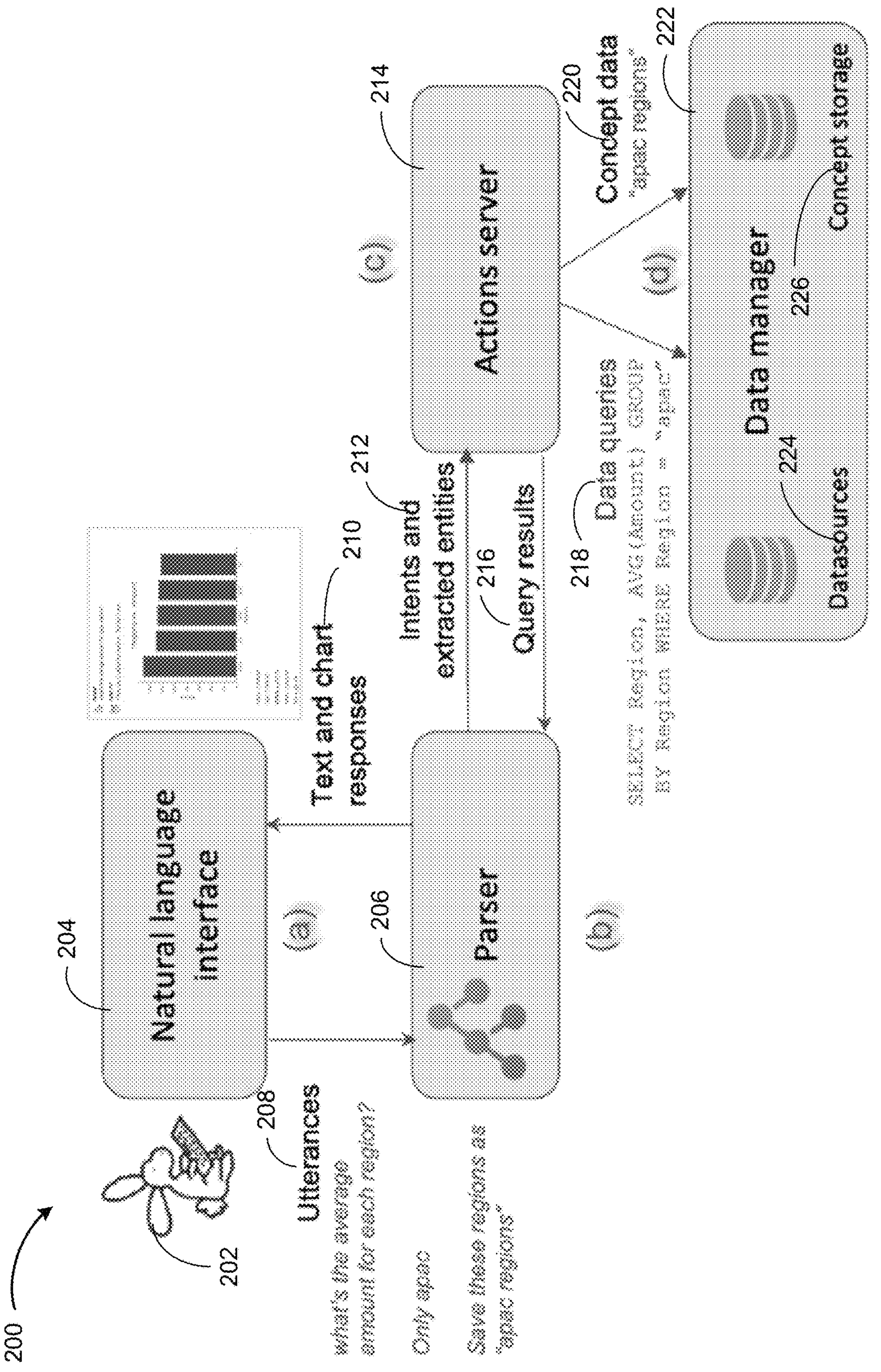
FIG. 2 is a block diagram of an example system for reusing concepts in visual analytics workflows, according to some implementations.

FIG. 2 is a block diagram of an example system 200 for reusing concepts in visual analytics workflows, according to some implementations. A user 202 inputs NL utterances 208 (e.g., "what's the average amount for each region", "only apac", "save these regions as 'apac regions'") via an NL interface 204. The NL interface 204 allows (a) users to interact in a conversation interface, such as Slack. The NL interface 204 passes the input to an NL parser 206. The NL parser is trained on a set of analytical intents (e.g., using an open-source conversational artificial intelligence (AI) library). The NL parser interprets (b) the intent of the NL utterances. The intents and data entities 212 extracted from the input utterance are passed to an action server 214. The action server 214 runs analytical queries against a set of configured data sources, returning query results 216 to the user. These are formatted as text and chart responses 210 for the user 202. The actions server 214 triggers (c) actions based on the intent and executes queries 218 (e.g., SELECT Region, AVG (amount) GROUP BY Region WHERE Region="apac") to data sources 224 hosted by a data manager 222. The system can create named concepts 220 (e.g., "apac regions") for later use in NL utterances, as well as persist these concepts in the data sources 224 and/or a concept storage 226 in the data manager 222, for use by other systems such as Tableau. The data manager 222 manages (d) query execution and concept persistence.

Example Natural Language Interface (NLI)

Some implementations of the NL interface 204 support a range of analytical queries that include aggregation (e.g., "what is the average amount?"), group (e.g., "show me the average amount for each region"), and filter (e.g. "filter to central") operations. Some implementations produce a text response for a single result (e.g., a single average value for "what is the average amount?") and visualizations for results that return more than a single row (e.g., a bar chart for "show me the average amount for each region.").

Example Parser Module

In some implementations, the parser 206 is trained on a set of analytical inquiries using templates of crowdsourced analytical queries. In some implementations, templates include slots for attributes, such as "what is the total (measure)?" where 'measure' is the name of the attribute that the parser needs to recognize from the NL utterance. In some implementations, as part of training, a set of data sources are specified over which the system operates. In some implementations, sample utterances and entities are dynamically generated as input to the training using the templates as a guide. For example, consider the data source with attributes sales, profit, and region. The region data field contains four data values: 'east', 'west', 'central', and 'south.' If there exist training templates-"show me (measure) by (dimension)" and "only for (value)", the system classifies sales and profit as measures because they are numeric, and region as a dimension, according to some implementations.

In some implementations, the parser 206 is based on named entity recognition that extracts information for locating and/or classifying named entities in unstructured text into pre-defined categories, such as person names, organizations, locations, medical codes, time expressions, quantities, monetary values and percentages. In some implementations, the parser 206 parameterizes definitions of concepts so the concepts can be referenced and/or reused. In some implementations, the parser 206 recognizes structures and/or concepts in subsequent utterances, and/or in other datasets, beyond predefined concepts, instead of, or in addition to, named entity recognition. In some implementations, the parser 206 handles ambiguity. For example, suppose a user points to a region by concept A. The user may save the bespoke concept. The parser 206 understands concepts and/or attributes that are relevant to a new dataset. The parser 206 may backfill missing information for the new dataset based on the saved concept and/or translate NL utterances based on the backfilled information.

Example Actions Server

Actions represent the analytical operations that can satisfy a user's intent. In some implementations, the actions server 214 realizes each action with a corresponding function that parameterizes the recognized entities from the NL utterances and the current conversational state of the system. The actions then trigger queries to the data sources for retrieving results for the utterances as well as persisting named concepts. This conversational state encompasses the current data source, the most recent query posed, the result for that query, any filters that are in play, and any saved concepts created by the users.

Example Reusable Concepts

In some implementations, a user can create a reusable concept from the result by saving the underlying data as a named concept or by querying the result and saving the resulting data as a named concept. In the former case, a query, "lets call these regions c1" would save the data in the region attribute as a concept c1. In the latter case, for a query such as "lets call these accounts c2" the referenced attribute account is not part of the current query results and so a new query is issued that adds data from account as the concept c2.

These concepts can subsequently be used in analytical queries and in other related data sources with shared attributes. For example, "what is the average amount for c1" would return the average of the attribute amount for those records that matched the concept c1. Concept c1 can be subsequently used in other data sources that have an attribute "region." FIG. 1 shows a concept ('apac' concept) based on a data source containing sales transactions by salespeople to particular customer accounts. A concept (e.g., the concept data 220) created on the first data source based on the account column can be used in queries against another data source containing marketing campaign activity associated with customer accounts.

In some implementations, saved concepts (sometimes referred to as named concepts) behave like mathematical induction or function and/or may be nested. Concepts are transferable across datasets and are not tied to one dataset or one attribute. Furthermore, the datasets may not be related through a matching column (e.g., via an equi-join, a join based on equality or matching column values), but could share attributes and/or values semantically.

Example Reuse of Concepts in Other Visual Analysis Workflows.

Reusable concepts are useful in other contexts besides a chatbot application. In some implementations, the system supports the persistence of these concepts in the data source from which the user created the concepts. In some implementations, a user makes a concept available in a data source via an utterance, such as "publish apac concept", which will persist the concept (e.g., the 'apac' concept) in the data source from which it was created. This concept can then be used in other visual analysis tools that import the data source for analysis.

Figure 3:
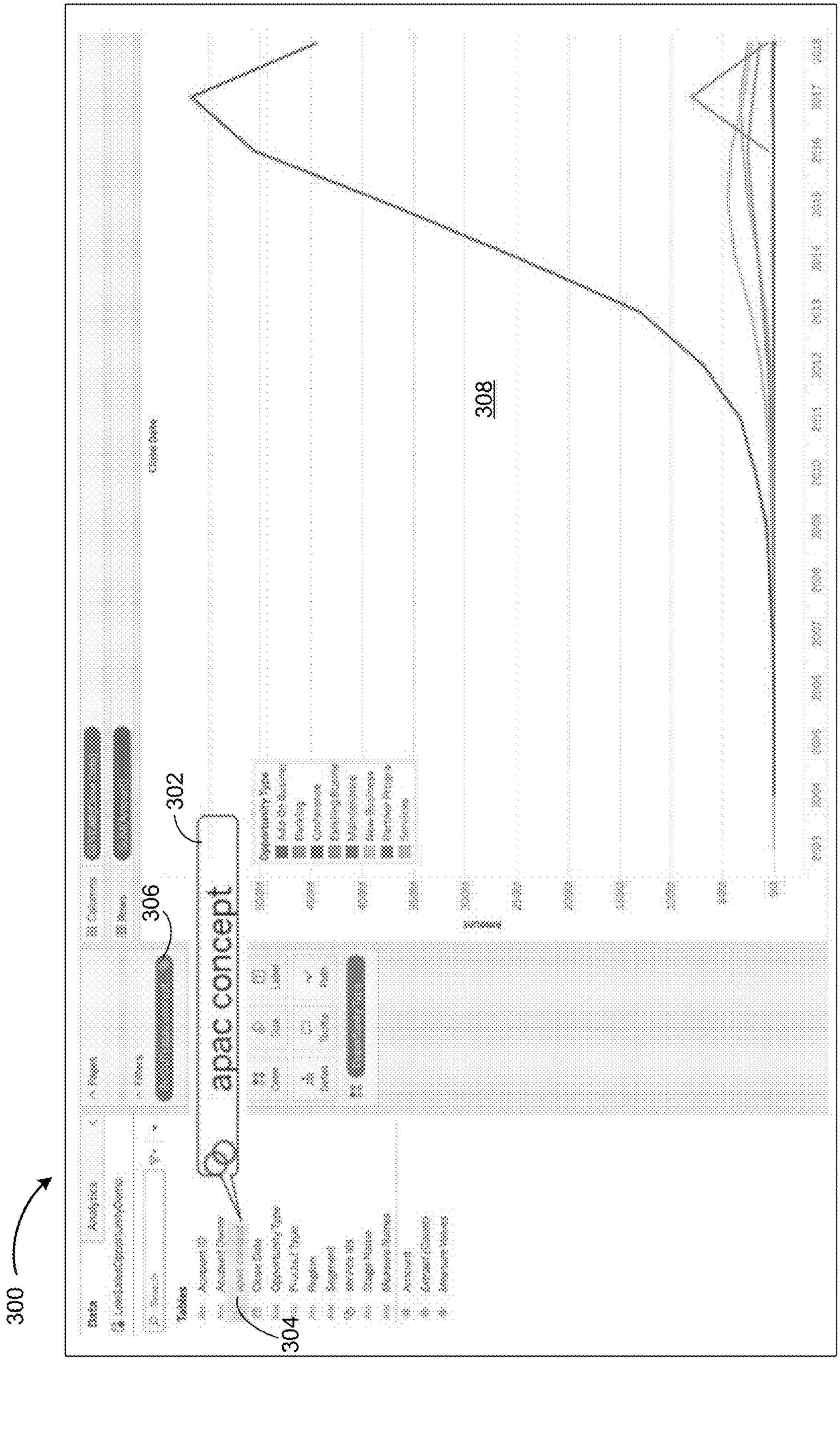
FIG. 3 shows an example graphical user interface for reusing custom concepts, according to some implementations.

FIG. 3 shows an example graphical user interface 300 for reusing custom concepts, according to some implementations. In the example shown, the concept (the 'apac' concept) 304 is used as a custom field to filter (306) values in a line chart 308. Specifically, the example shows a Tableau workbook using a reusable concept (the "apac concept") 304 created as described above in reference to FIG. 1. The highlighted concept 304 (also shown in the callout 302) is used as a filter 306 on 'apac' regions in the line chart 308.

Figure 4A:
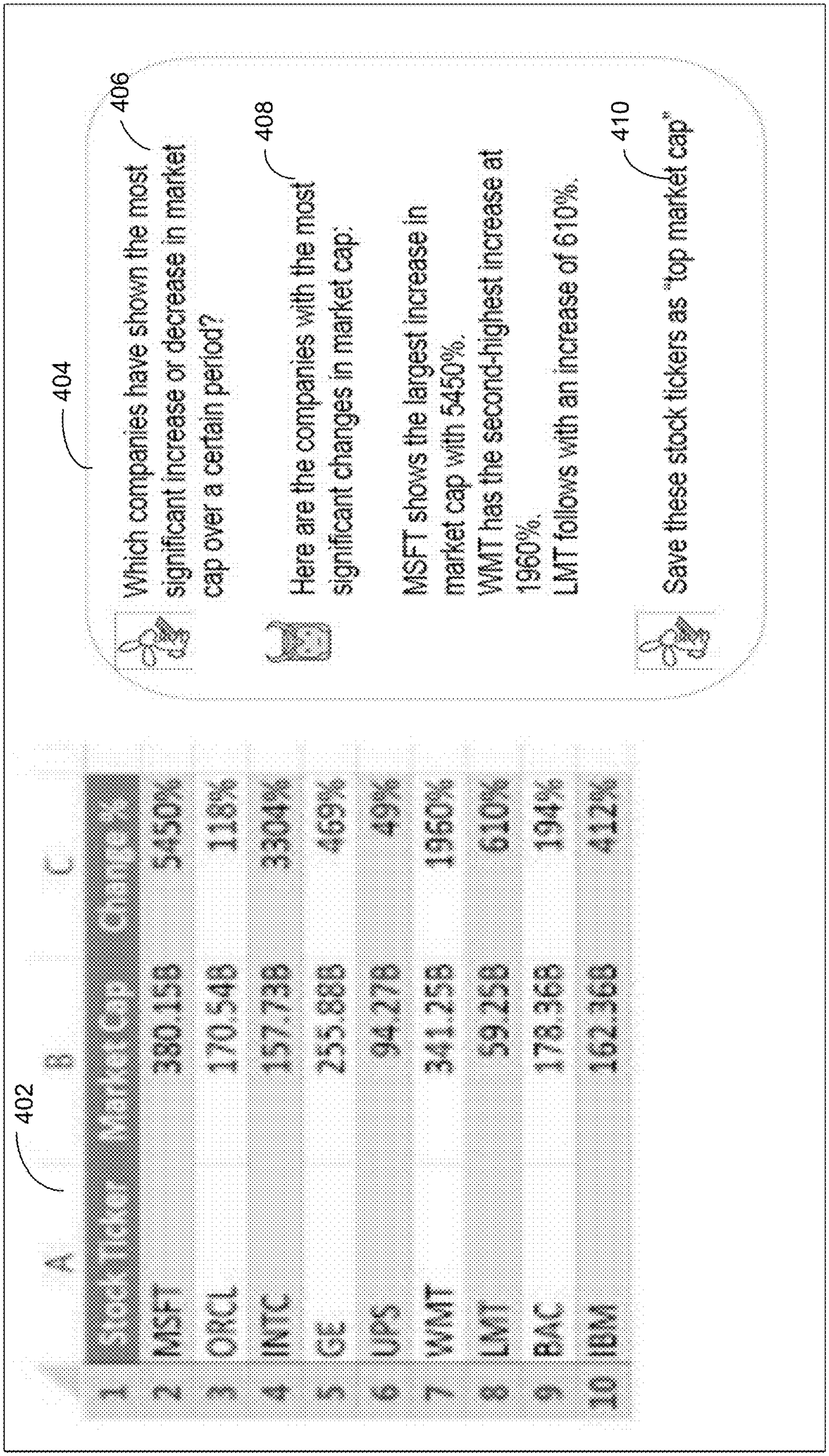
FIG. 4A shows an example user interface for defining concepts, according to some implementations.

FIG. 4A shows an example user interface 400 for defining concepts, according to some implementations. A table 402 is shown to a user. The user may pose (e.g., in a conversational interface 404) a question (e.g., "which companies have shown the most significant increase or decrease in market cap over a certain period?" 406) to which the system responds (408) with companies that have the most significant changes in market cap. The user may then request (410) to save these stock tickers as "top market cap" (a new or existing concept).

Figure 4B:
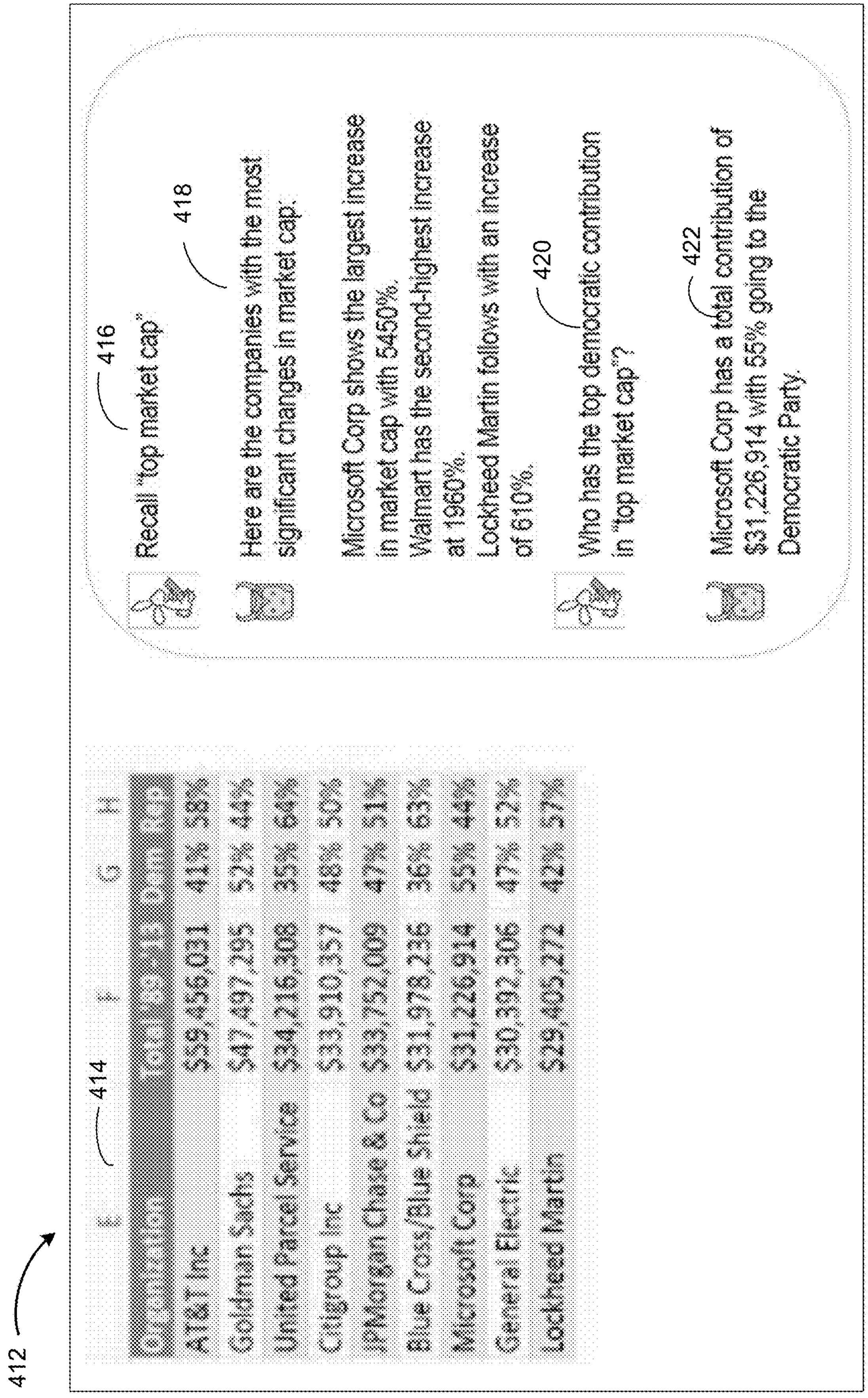
FIG. 4B shows another example user interface for reusing concepts, according to some implementations.

FIG. 4B shows another example user interface 412 for reusing concepts, according to some implementations. The example shows a data source (a table 414) that is different from the first table 402 in FIG. 4A used to create the "top market cap" concept. Suppose the user asks the system to recall (416) "top market cap" (defined as described above in reference to FIG. 4A). The system responds (418) with the companies having the most significant changes in market cap. The user may also ask questions with respect to the saved concept. Suppose the user asks the question "who has the top democratic contribution in "top market cap" 420. The system responds with details 422 of the company (within the companies listed in the response 418) that has the most total contribution. In some implementations, the system supports reusability of concepts across data sources that may not share the same column (semantic join). In this example, the tables 402 and 414 do not share a column.

Figure 4C:
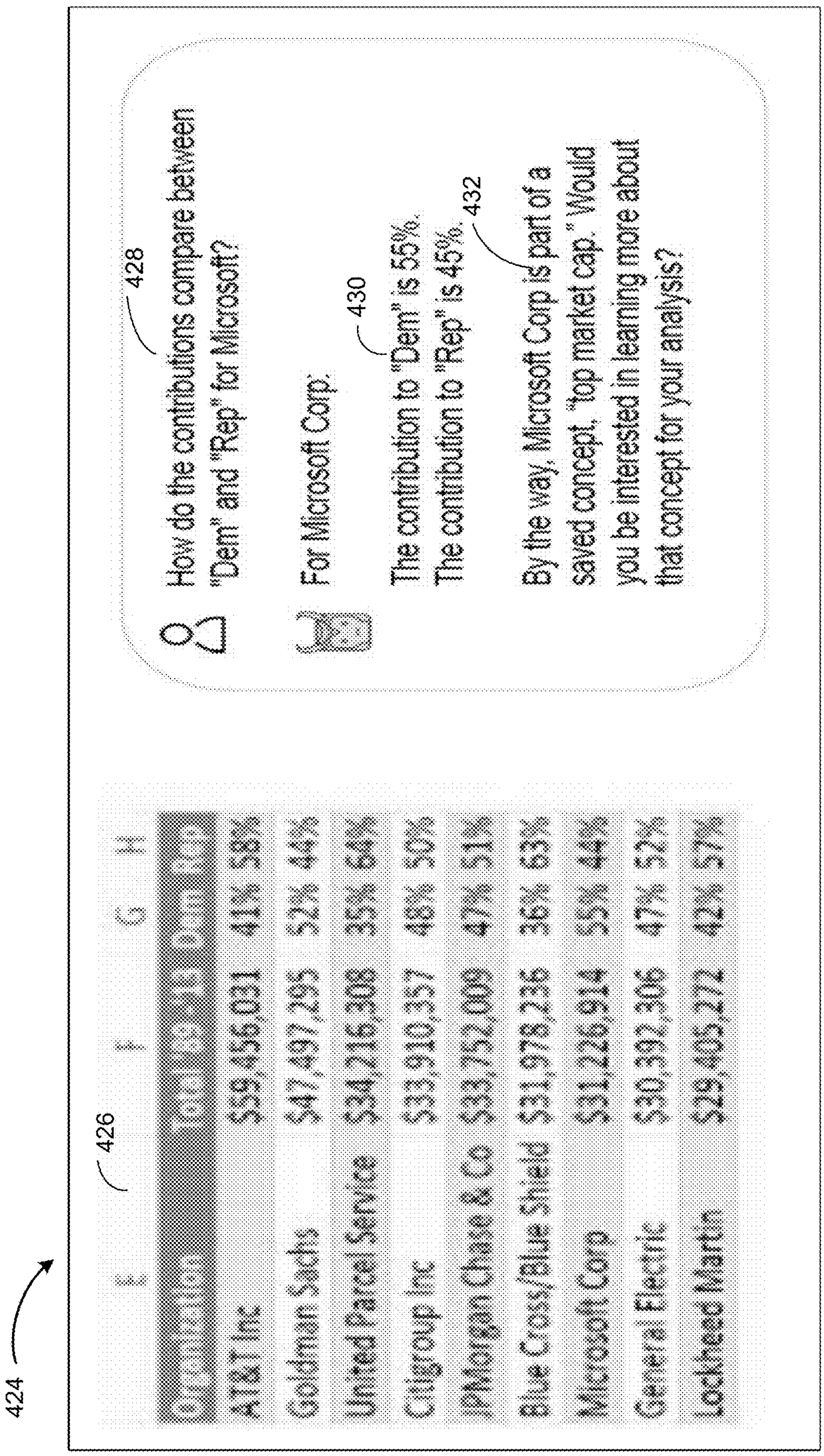
FIG. 4C shows another example user interface for reusing concepts, according to some implementations.

FIG. 4C shows another example user interface 424 for reusing concepts, according to some implementations. Suppose a user different from the one who created the "top market cap" concept is initially shown a table 426. Further suppose that the user asks a question 428 with respect to the table. In addition to providing a response 430 for the question posed by the user, the system responds with a suggestion 432 for a saved concept (sometimes referred to as a reusable concept). The system may provide details of the saved concept depending on the user response. In some implementations, the system recommends a concept based on a user's analytical workflow (even if the user did not create the concept). Here, the system automatically inferred that the total column F represents a market cap (even though the user did not explicitly refer to the column that way) and responds with a suggestion for a reusable concept. A different user may create the reusable concept, during a different session of the user, and/or for a different data source.

Example Results

Tests were conducted to (1) collect feedback on how people express and save user-defined concepts and (2) identify system limitations and opportunities for how reusable concepts can be used to further data exploration. Volunteers were recruited from a mailing list. The participants had a variety of backgrounds (e.g., user researcher, sales consultant, engineer, product manager, commercial real estate broker, and marketing manager). Based on self-reporting by the participants, all were fluent in English and extensively used some type of NL interface, such as Google. Some participants extensively used a visualization tool, and the rest had limited proficiency. Participants could interact with two datasets—(1) 'Sales Opportunities' with attributes describing product sales such as Account ID, Account Owner, Amount, Region, Segment, Opportunity Type, Product Type, and Close Date; or (2) 'Online Activity' with attributes describing activity in an online service such as Sales Account Id, Activity Count, and Activity Name.

The tests started with a short introduction of how to use the system and the types of intents it recognizes. Participants were instructed to phrase their queries in whatever way that felt most natural and to tell us whenever the system did something unexpected. Reactions to system behavior were noted throughout the session and concluded with an interview. Each session took approximately 45 minutes. A mixed-methods approach involving qualitative and quantitative analysis, and the quantitative analysis was used as a complement to the qualitative findings. Overall, participants were positive about the premise of saving and reusing custom concepts in their analytical workflows. The participants appreciated the convenience of being able to save complex and compound queries that involve grouping, aggregation, and filter expressions as named concepts. In some implementations, saving and reusing concepts perform similarly to bookmarking web pages during browsing. The total number of queries that participants typed ranged from 7 to 28 ($\mu$=12.2). The number of times participants saved an utterance as a concept in each study session ranged from 3 to 12 ($\mu$=6.5). Participants reused these saved concepts 3 to 10 ($\mu$=5.1) times in subsequent utterances in their user sessions. The most common analytical queries involved group and filter expressions (48%), such as "show me account owners by segment filter region to apac." The second most common concept involved aggregation, group, and filter expressions (45%), such as "average amount by product type, only services." The remaining concepts involved group utterances, such as "account owner by segment."

Example Uses of Concepts

In addition to the ability to name and persist concepts, some implementations provide additional system capabilities for constructing concept maps that take into account hierarchies and relationships between concepts and the data attributes. For example, a user may save a concept for customers in Europe, and create another one where the user filters by Close Date. The user can see their concepts with the hierarchy between them. In some implementations, the system constructs a concept map based on common attributes and determines relational dependencies to place the concepts at the appropriate level in a concept hierarchy.

Repair and refinement of concepts. Some implementations enable users to refer back to the concepts they have saved. Some implementations allow users to repair the concepts, especially modifying the filter criteria saved in the concept. For example, suppose a user creates a concept "customer watch" based on a region, but then decides to change it. Some implementations provide a user interface (e.g., with affordances) to change attributes and other details of a concept to refine and/or repair concepts.

Some implementations assign permissions and role for updating concepts so as to control access to concepts. In some implementations, users can copy and personalize concepts. Some implementations support a collaborative approach to refinement of concepts in situations where the data source is shared within a team. In that way, a team can update the same concept rather than duplicating efforts. In some implementations, concepts can be managed, updated, and/or refined based on scope and need.

Recommendations. Some implementations provide relevant scaffolding and guidance to support users as they frame their NL utterances while exploring data. Some implementations provide recommendations to suggest pertinent concepts that they could create and explore with the data sources. Some implementations provide onboarding features that show concepts that others may have saved. A user can then use the recommended concepts or tweak the concepts before using them. Some implementations support guided discovery learning through concept recommendations.

Figure 5:
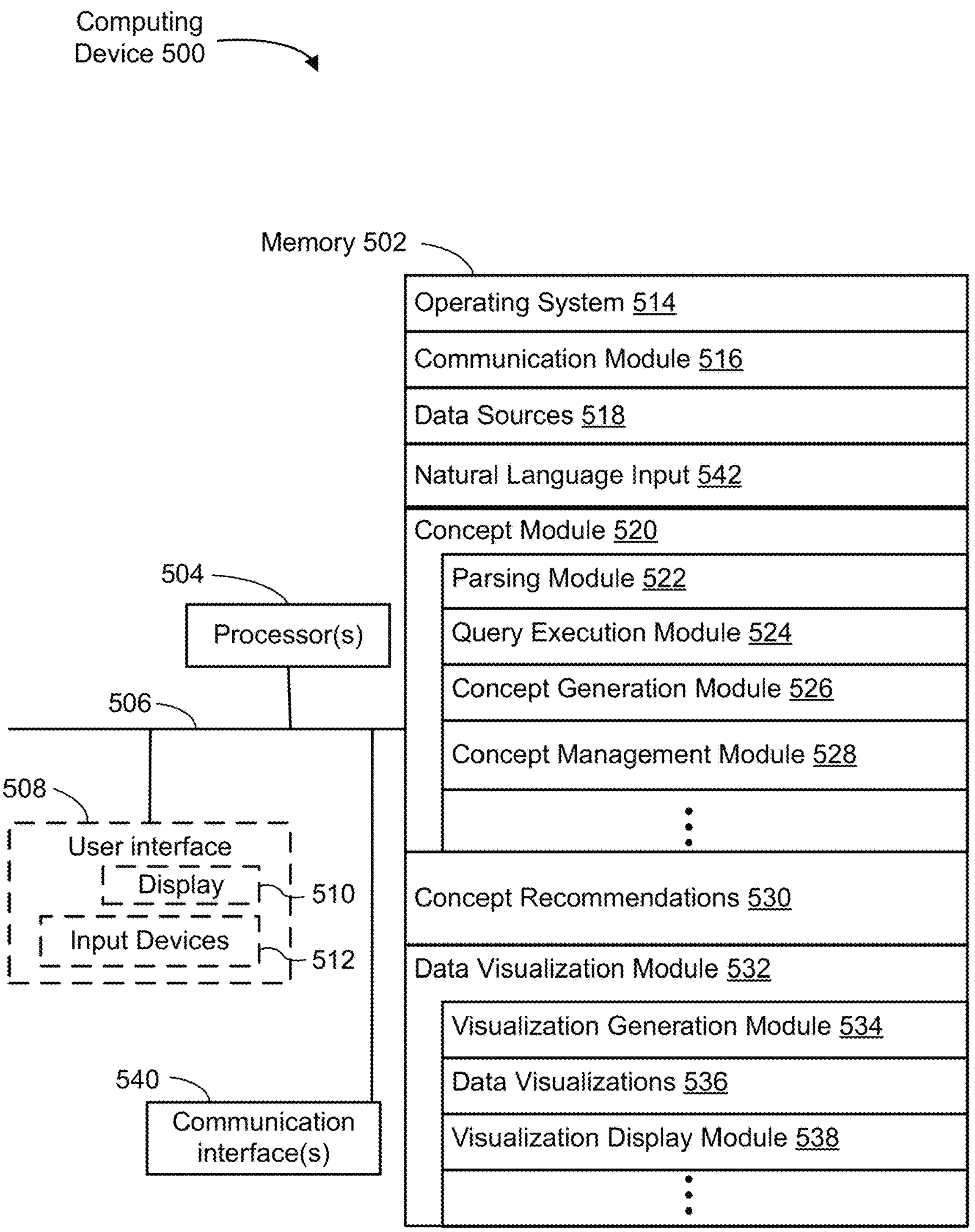
FIG. 5 is a block diagram of an example computing device for reusing custom concepts in visual analytic workflows, according to some implementations.

FIG. 5 is a block diagram of an example computing device 500 for reusing custom concepts in visual analytic workflows, according to some implementations. The computing device 500 may host one or more databases that include data sources or may provide various executable applications or modules. The computing device 500, which may be a server, typically includes one or more processing units/cores (e.g., CPUs, GPUs, ASICs) 504, one or more communication network interfaces 540, memory 502, and one or more communication buses 506 for interconnecting these components. In some implementations, the computing device 500 includes a user interface 508, which includes a display 510 and one or more input devices 512 (e.g., a keyboard, a touch interface, and/or a mouse). In some implementations, the communication buses 506 include circuitry (sometimes called a chipset) that interconnects and controls communications between system components.

In some implementations, the memory 502 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 502 includes one or more storage devices remotely located from the processors 504. The memory 502, or alternatively the non-volatile memory devices within the memory 502, comprises a non-transitory computer readable storage medium.

In some implementations, the memory 502, or the computer readable storage medium of the memory 502, stores the following programs, modules, and data structures, or a subset thereof:

- an operating system 514, which includes procedures for handling various basic system services and for performing hardware dependent tasks;
- a network communication module 516, which is used for connecting the computing device 500 to other computers via the one or more communication network interfaces 540 (wired or wireless) and one or more communication networks, such as the Internet, other wide area networks, local area networks, metropolitan area networks, and so on;
- data sources 518 (e.g., the sales transaction data source described above in reference to FIG. 1) may include one or more databases or data sources. In some implementations, the data sources are stored as spreadsheet files, CSV files, text files, JSON files, XML files, or flat files, or stored in a relational database;
- natural language input 542, which includes natural language utterances obtained from a user (e.g., via the input devices 512). Examples of natural language input are described above in reference to FIGS. 1, 2, 4A, 4B, and 4C, according to some implementations. In some implementations, the natural language input is provided via a conversational interface (e.g., Slack) that supports natural language interactions;
- a concept module 520, which includes a parsing module 522 (e.g., the parser 206), a query execution module 524, a concept generation module 526, and/or a concept management module 528 (e.g., for managing users, user access, and concepts, and for building concept graphs);
- concept recommendations 530, which include concepts generated and/or recommended by the concept generation module 526. The concepts may be suggested for a same user during a different session or visual analytic workflow, for a different user, and/or for a different data source; and/or
- a data visualization module 532, which includes a visualization generation module 534, data visualizations 536, a visualization display module 538, and/or other modules and data structures for visualizing and/or displaying recommendations of concepts. In some implementations, the data visualization module 532 stores visual specifications, which are used to build data visualizations.

FIG. 5 is intended more as a functional description of the various features that may be present rather than as a structural schematic of the implementations described herein. In practice, and as recognized by those of ordinary skill in the art, items shown separately could be combined and some items could be separated. Details of the programs, modules, and data structures are described below in reference to the flowchart in FIG. 6, according to some implementations.

Figure 6:
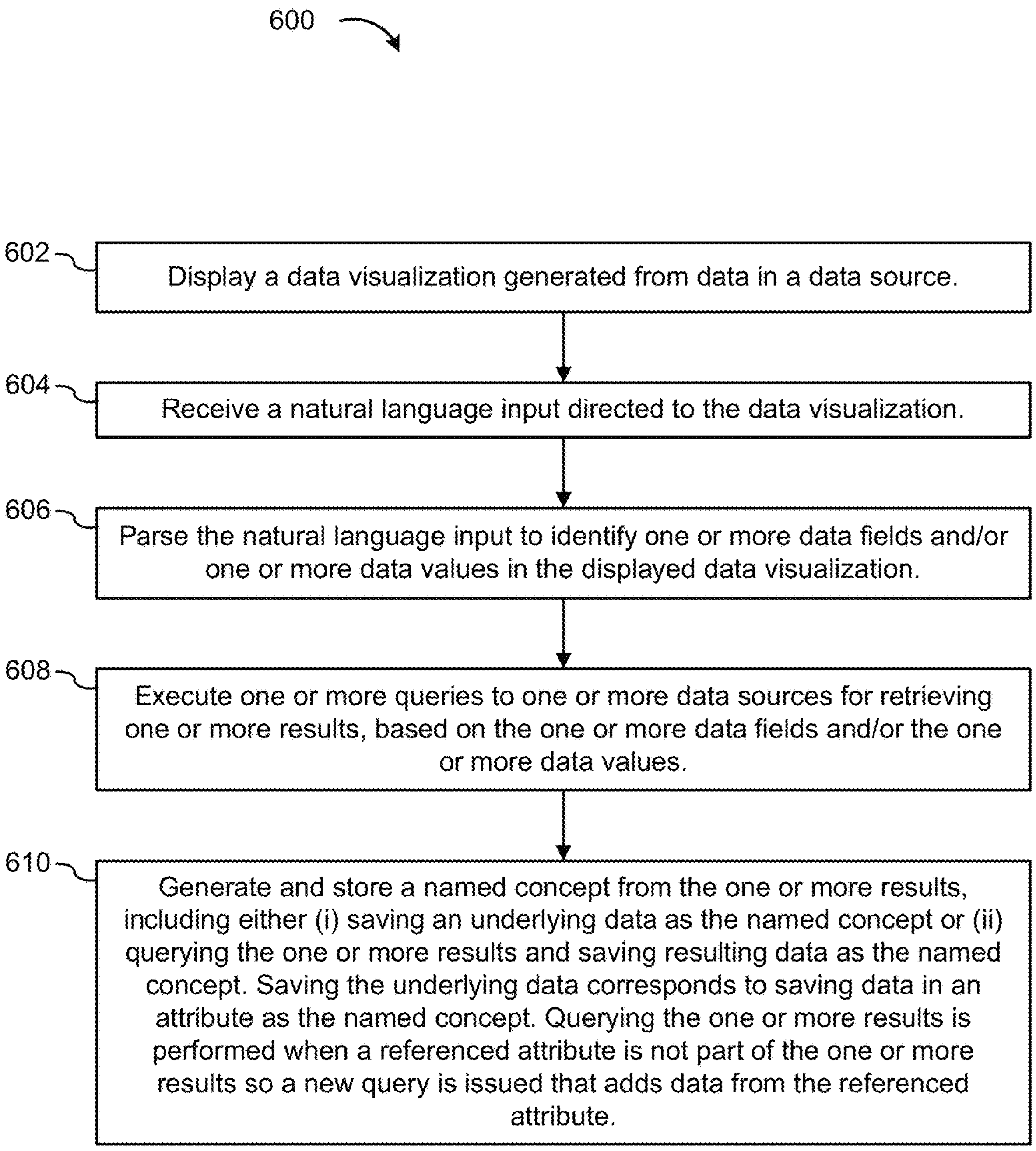
FIG. 6 is a flowchart of an example process for reusing custom concepts during visual analytic workflows, according to some implementations.

FIG. 6 is a flowchart of an example process 600 for reusing custom concepts during visual analytic workflows, according to some implementations. The process may be performed at an electronic device 500 with a display 510, one or more processors 504, and memory 502. For example, the electronic device can be a smart phone, a tablet, a notebook computer, or a desktop computer.

The method includes displaying (602) (e.g., by the data visualization module 532, based on a visual specification) a data visualization generated from data in a data source (e.g., the data sources 518). Examples of data visualizations are described above in reference to FIG. 1 (e.g., the charts 108 and 114), FIG. 4A (e.g., the table 402), FIG. 4B (e.g., the table 414), and FIG. 4C (e.g., the table 402). The data visualizations may be displayed in a graphical user interface or as part of a conversational interface supporting natural language interactions with a user.

The method also includes receiving (604) a natural language input (e.g., the natural language input 542) directed to the data visualization. In some implementations, the natural language input is received via a natural language conversational interface that supports analytical queries having aggregation, grouping, and/or filtering. In some implementations, the natural language conversational interface produces a text response for a single result and visualizations for results that return more than a single row.

The method also includes parsing (606) (e.g., by the parsing module 522) the natural language input to identify one or more data fields and/or one or more data values in the displayed data visualization. In some implementations, the parsing includes extracting intents and data entities from the natural language input using a natural language parser. In some implementations, the natural language parser is trained on a set of analytical intents using a conversational artificial intelligence library. In some implementations, the natural language parser is trained on a set of analytical inquiries using templates of crowdsourced analytical queries. The templates include slots for attributes that the natural language parser needs to recognize from a natural language utterance. The training specifies a set of data sources for the natural language parser to operate on. Sample utterances and entities are dynamically generated as input to the training using the templates as a guide.

The method also includes executing (608) (e.g., by the query execution module 524) one or more queries to one or more data sources for retrieving one or more results, based on the one or more data fields and/or the one or more data values.

The method also includes generating and storing (610) (e.g., by the concept generation module 528) a named concept (e.g., the concept recommendations 530) from the one or more results, including either (i) saving underlying data as the named concept or (ii) querying the one or more results and saving resulting data as the named concept. Saving the underlying data corresponds to saving data in an attribute as the named concept. Querying the one or more results is performed when a referenced attribute is not part of the one or more results so a new query is issued that adds data from the referenced attribute.

In some implementations, the method further includes triggering (e.g. by the query execution module 524) one or more actions based on the one or more data fields and/or the one or more data values. The one or more actions represent analytical operations that satisfy a user's intent specified in the natural language input. The one or more actions subsequently trigger the one or more queries. In some implementations, each action of the one or more actions is realized with a corresponding function that parameterizes entities recognized from the natural language input and a current conversational state. In some implementations, the current conversational state encompasses the current data source, the most recent query posed, the result for that query, any filters in play, and any previously saved named concepts.

In some implementations, the method further includes subsequently using the named concept (e.g., the concept generation module 526 may suggest and/or automatically use the concept recommendations 530) in one or more analytical queries that follow the natural language input. For example, the named concept ("top market cap") in FIG. 4A is used in the workflow in FIG. 4B.

In some implementations, the method further includes subsequently using the named concept in one or more analytical queries directed to other data sources with shared attributes. For example, the named concept in FIG. 4A is used in the workflow in FIG. 4C. For example, the concept generation module 526 may suggest and/or automatically use the concept recommendations 530 for a different data source.

In some implementations, the method further includes subsequently using the named concept (e.g., the concept generation module 526 may suggest and/or automatically use the concept recommendations 530) in one or more analytical queries posed by one or more users that are different from a user who created the named concept. The concept management module 528 may track a user who creates the concept, user permissions, and/or control access for saved concepts.

In some implementations, the method further includes persisting the named concept in the data source from which the named concept is created.

In some implementations, executing the one or more queries (e.g., by the query execution module 524) includes running, against a set of configured data sources, one or more analytical queries based on the intents and data entities, thereby returning the one or more results.

In some implementations, the method further includes, in response to a user requesting, via a natural language utterance, to make the named concept available in a specified data source, subsequently using the named concept in one or more analytical queries directed to the specified data source.

In some implementations, the method further includes subsequently using (e.g., by the concept generation module 526) the named concept in other visual analysis tools that import the data source for analysis (an example of which is described above in reference to FIG. 3).

In some implementations, the method further includes subsequently using (e.g., by the concept generation module 526) the named concept as a custom field to filter values in a line chart.

In some implementations, the method further includes associating (e.g., by the concept management module 528) a user with the named concept, and managing updates and/or refinements to the named concept based on the association.

In some implementations, the method further includes associating (e.g., by the concept management module 528) a user with the named concept, and performing at least one of: personalizing the named concept for a user, controlling access to the named concept, and personalizing the saved concept based on a dataset.

In some implementations, the method further includes building (e.g., by the concept management module 528) a concept map based on common attributes and determining relational dependencies to place the named concept at an appropriate level in a concept hierarchy or a concept nesting, and based on concepts in the concept map, providing recommendations that are relevant scaffolding and/or guidance to support natural language interface users as they frame their natural language utterance while exploring data.

In some implementations, the method further includes tracking (e.g., by the concept management module 528) frequency and commonality of a combination of attributes in input natural language utterances to automatically trigger the generation and storing of the named concept without user input.

In some implementations, the method further includes parameterizing (e.g., by the concept management module 528) the named concept based on attribute value and type, and reusing (e.g., by the concept generation module 526) the named concept based on the parameterization.

In this way, an analytical chatbot system is provided for enabling users to save bespoke named concepts during their analytical workflows. Described above are example techniques for defining concepts based on attributes in one data source that could then be referenced using another data source sharing similar attributes. Further, some implementations support the persistence of these named concepts in the data source that they originated from and can be used in another visual analysis tool that imports the updated data source. Example tests showed the usefulness of supporting the reuse of custom concepts across a variety of visual analytics workflows.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of reusing custom concepts in visual analytics workflows, performed at a computer device having one or more processors and memory storing one or more programs configured for execution by the one or more processors, the method comprising:

receiving, via a user interface, a first natural language input directed to a first data source having a plurality of data fields and a plurality of data values corresponding to the plurality of data fields;

parsing the first natural language input to identify one or more data fields and/or one or more data values of the first data source;

executing one or more queries against a set of one or more data sources to retrieve one or more results, based on the one or more data fields and/or the one or more data values;

returning, via the user interface, the one or more results, wherein a respective result is formatted as a respective text and chart response;

generating and storing a first result, of the one or more results, as a first named concept, including saving underlying data of a first data field of the first result as the first named concept;

persisting the first named concept as a reusable custom data field in the same first data source from which the first named concept is created, wherein the underlying data of the first data field that is saved in the first named concept are data values of the reusable custom data field;

receiving a second natural language input referencing (i) the first named concept and (ii) a second data field from a data source, wherein the second natural language input includes the first named concept and the second data field is not part of the one or more results;

in response to receiving the second natural language input, executing one or more updated queries against the set of one or more data sources to retrieve an updated result based on the data values of the reusable custom data field persisted in the first data source and data of the second data field; and generating and storing a second named concept according to the updated result.

2. The method of claim 1, further comprising:

triggering one or more actions based on the one or more data fields and/or the one or more data values, wherein the one or more actions represent analytical operations that satisfy a user's intent specified in the first natural language input, and the one or more actions subsequently trigger the one or more queries.

3. The method of claim 2, wherein each action of the one or more actions is realized with a corresponding function that parameterizes entities recognized from the first natural language input and a current conversational state.

4. The method of claim 3, wherein the current conversational state encompasses a current data source, a most recent query posed, a result for that query, any filters in play, and any previously saved named concepts.

5. The method of claim 1, further comprising:

subsequently using the first named concept in one or more analytical queries that follow the first natural language input.

6. The method of claim 1, further comprising:

subsequently using the first named concept in one or more analytical queries directed to other data sources with shared data fields.

7. The method of claim 1, further comprising:

subsequently using the first named concept in one or more analytical queries posed by one or more users that are different from a user who created the first named concept.

8. The method of claim 1, further comprising:

in response to a user requesting, via a natural language utterance, to make the first named concept available in a specified data source:

subsequently using the first named concept in one or more analytical queries directed to the specified data source.

9. The method of claim 1, further comprising:

subsequently using the first named concept in other visual analysis tools that import the first data source for analysis.

10. The method of claim 1, further comprising:

displaying the reusable custom data field in the user interface; and applying the reusable custom data field to filter values in a line chart.

11. The method of claim 1, further comprising:

associating a user with the first named concept; and managing updates and/or refinements to the first named concept based on the association.

12. The method of claim 1, further comprising:

associating a user with the first named concept; and performing at least one of: personalizing the first named concept for a user, controlling access to the first named concept, and personalizing the first named concept based on a dataset.

13. The method of claim 1, further comprising:

building a concept map based on common data fields and determining relational dependencies to place the first named concept at an appropriate level in a concept hierarchy or a concept nesting; and based on concepts in the concept map, providing recommendations that are relevant scaffolding and/or guidance to support natural language interface users as they frame their natural language utterance while exploring data.

14. The method of claim 1, further comprising:

tracking frequency and commonality of a combination of data fields in input natural language utterances to automatically trigger the generation and storing of the first named concept without user input.

15. The method of claim 1, further comprising:

parameterizing the first named concept based on the data values of the reusable custom data field and a field type of the reusable custom data field; and reusing the first named concept based on the parameterization.

16. The method of claim 1, wherein the second data field is from a second data source that is different from the first data source.

17. The method of claim 1, wherein executing the one or more updated queries against the set of one or more data sources to retrieve the updated result comprises:

executing the one or more updated queries against a second data source that is different from the first data source, wherein the first data source and the second data source share one or more data fields and/or data values semantically without having a matching data column.

18. A computer device, comprising:

one or more processors;

memory; and one or more programs, wherein the one or more programs are stored in the memory and configured to be executed by the one or more processors, the one or more programs including instructions for:

receiving, via a user interface, a first natural language input directed to a first data source having a plurality of data fields and a plurality of data values corresponding to the plurality of data fields;

parsing the first natural language input to identify one or more data fields and/or one or more data values of the first data source;

executing one or more queries against a set of one or more data sources to retrieve one or more results, based on the one or more data fields and/or the one or more data values;

returning, via the user interface, the one or more results, wherein a respective result is formatted as a respective text and chart response;

generating and storing a first result, of the one or more results, as a first named concept, including saving underlying data of a first data field of the first result as the first named concept;

persisting the first named concept as a reusable custom data field in the same first data source from which the first named concept is created, wherein the underlying data of the first data field that is saved in the first named concept are data values of the reusable custom data field;

receiving a second natural language input referencing (i) the first named concept and (ii) a second data field from a data source, wherein the second natural language input includes the first named concept and the second data field is not part of the one or more results;

in response to receiving the second natural language input, executing one or more updated queries against the set of one or more data sources to retrieve an updated result based on the data values of the reusable custom data field persisted in the first data source and data of the second data field; and generating and storing a second named concept according to the updated result.

19. The computer device of claim 18, wherein the user interface is configured to:

support analytical queries having aggregation, grouping, and/or filtering; and produce a text response for a single result and visualizations for results that return more than a single row.

20. A non-transitory computer readable storage medium storing one or more programs configured for execution by a computer device, the one or more programs comprising instructions for:

receiving, via a user interface, a first natural language input directed to a first data source;

parsing the first natural language input to identify one or more data fields and/or one or more data values of the first data source;

executing one or more queries against a set of one or more data sources to retrieve one or more results, based on the one or more data fields and/or the one or more data values;

returning, via the user interface, the one or more results, wherein a respective result is formatted as a respective text and chart response;

generating and storing a first result, of the one or more results, as a first named concept, including saving underlying data of a first data field of the first result as the first named concept;

persisting the first named concept as a reusable custom data field in the same first data source from which the first named concept is created, wherein the underlying data of the first data field that is saved in the first named concept are data values of the reusable custom data field;

receiving a second natural language input referencing (i) the first named concept and (ii) a second data field from a data source, wherein the second natural language input includes the first named concept and the second data field is not part of the one or more results;

in response to receiving the second natural language input, executing one or more updated queries against the set of one or more data sources to retrieve an updated result based on the data values of the reusable custom data field persisted in the first data source and data of the second data field; and generating and storing a second named concept according to the updated result.

* * * * *